United States Patent [19]

Kondo

[11] Patent Number: 4,833,527
[45] Date of Patent: May 23, 1989

[54] LUMINANCE SIGNAL FORMING CIRCUIT

[75] Inventor: Toshiharu Kondo, Kanagawa, Japan

[73] Assignee: Sony Corp., Tokyo, Japan

[21] Appl. No.: 133,787

[22] Filed: Dec. 16, 1987

[30] Foreign Application Priority Data

Jan. 9, 1987 [JP] Japan ................................. 62-2868

[51] Int. Cl.[4] ......................... H04N 9/69; H04N 9/07
[52] U.S. Cl. ....................................... 358/32; 358/39; 358/44
[58] Field of Search .................... 358/32, 39, 41, 44

[56] References Cited

U.S. PATENT DOCUMENTS 3,752,905 8/1973 Schneider ............................. 358/32
4,697,208 9/1987 Eino ..................................... 358/32

FOREIGN PATENT DOCUMENTS 240282 11/1985 Japan ..................................... 358/32

*Primary Examiner*—John W. Shepperd
*Attorney, Agent, or Firm*—Alvin Sinderbrand

[57] ABSTRACT

In a luminance signal forming circuit, output signals from a color television camera having complementary color filters are subjected to a matrix operation to provide a first luminance signal of good luminance reproducibility, but having a relatively low signal-to-noise (S/N) ratio, and the output signals from the camera are further simply mixed to form a second or pseudo luminance signal of relatively poor signal fidelity but having a relatively high S/N ratio. The first and second luminance signals are subjected to first and second gamma corrections, respectively, which provide a first gamma characteristic having an inclination less than that for the usual or normal gamma value, while the second gamma correction provides a characteristic having an inclination substantially smaller than that of the first gamma characteristic. The gamma corrected luminance signals are selectively included in an output luminance signal so that when an average level of the first and second luminance signals is high, at least a relatively large proportion of the output luminance signal is constituted by the first luminance signal with the first gamma characteristic and, when the average level is low, at least a relatively large proportion of the output luminance signal is constituted by the second luminance signal having the second gamma characteristic.

10 Claims, 4 Drawing Sheets

LUMINANCE SIGNAL FORMING CIRCUIT

BACKGROUND OF THE INVENTION

1. Field of the Invention

This invention relates generally to a luminance signal forming circuit and, more particularly, is directed to a luminance signal forming circuit for use with a color television camera having complementary color filters.

2. Description of the Prior Art

As is well known, complementary color filters may be used to block a selected color component of the primary colors, that is, red (R), green (G) and blue (B). A yellow ($Y_E$) complementary filter passes R and G components therethrough, a cyan ($C_Y$) complementary filter passes G and B components therethrough, a magenta ($M_G$) complementary filter passes R and B components therethrough, and a white (W) complementary filter passes all of the R, G and B primary color components therethrough.

Thus, two or more primary color components, for example, color components R and G, color components G and B, color components R and B, or color components R, G and B, can pass through a single filter when the described complementary color filters are used in a color television camera. As a result the number of filters in the light path can be reduced so that there is an increase in the quantity of light of the primary color components incident on the image pick-up device, such as, the image pick-up tube or solid state image pick-up element. Accordingly, even when an image of a relatively dark object is projected onto the image pick-up device, a video signal output having a relatively high level can be obtained from the camera using complementary filters.

As disclosed in U.S. patent application Ser. No. 07/100,223, filed Sept. 23, 1987, and having a common assignee herewith, and which was allowed Sept. 28, 1988, it has been proposed to provide a color television camera having complementary color filters with a luminance signal forming circuit in which complementary color signals are separated from the output signals of the television camera, primary color signals are obtained from the complementary color signals and, in a matrixing operation, a first luminance signal and suitable color-difference signals, such as, R—Y and B—Y, are obtained from the primary color signals. A second luminance signal is obtained merely by mixing the complementary color signals, and the resulting first and second luminance signals are combined for providing a composite luminance output signal. In the foregoing proposed luminance signal forming circuit, the first luminance signal obtained in a matrixing operation from the primary color signals has good luminance reproducibility or fidelity, but a relatively poor S/N ratio due to color noise. The second luminance signal obtained by merely mixing the complementary color signals is, in fact, a pseudo luminance signal in that the ratios of the primary color signal components therein deviate from the standard, so that the second luminance signal has relatively poor luminance reproducibility or fidelity, but a relatively high S/N ratio. In forming the composite luminance output signal, it is intended that the good luminance reproducibility of the first luminance signal will be obtained while maintaining the high S/N ratio of the second luminance signal. However, in designing the proposed luminance signal forming circuit, a compromise has to be made between the attainment of good luminance reproducibility and a high S/N ratio, and both of these characteristics can not be appropriately maintained for all signal states, that is, when the output signals from the television camera have high levels and low levels, respectively.

OBJECTS AND SUMMARY OF THE INVENTION

Accordingly, it is an object of the present invention to provide a luminance signal forming circuit for a color television camera having complementary color filters, and which is capable of selecting a luminance signal of good luminance reproducibility or a luminance signal having a high S/N ratio in accordance with the amount of light incident on the image pickup device of the camera, while providing gamma correction appropriate for the selected luminance signal.

Another object of the present invention is to provide a luminance signal forming circuit, as aforesaid, in which a gamma correction curve is varied in the direction for decreasing the noise component of an output luminance signal in accordance with the quantity of light incident on the image pickup device of the camera.

A further object of the present invention is to provide a luminance signal forming circuit, as aforesaid, in which the proportions, in an output luminance signal, of a luminance signal of good luminance reproducibility and a luminance signal substantially free of noise are varied in accordance with the quantity of light incident on the image pickup device of the camera and the appropriate gamma correction is applied for obtaining an optimal luminance signal.

In accordance with an aspect of this invention, a color television camera having complementary color filtering means through which light from an object is incident on image pickup means for providing output signals therefrom, has a luminance signal forming circuit which comprises means for performing a matrixing operation in respect to the output signals from the camera so as to provide a first luminance signal having good luminance reproducibility and a relatively poor S/N ratio, first gamma correction means for providing the first luminance signal with a first gamma characteristic having a predetermined inclination, means for mixing the output signals from the camera so as to obtain therefrom a second luminance signal having a good S/N ratio but relatively poor luminance reproducibility, second gamma correction means for providing the second luminance signal with a second gamma characteristic having an inclination substantially smaller than the inclination of the first gamma characteristic, and means for selectively including the first and second luminance signals in an output luminance signal in accordance with an average level of the first and second luminance signals corresponding to the amount of light incident on the image pickup means so that, when the average level is high, at least a relatively large proportion of the output luminance signal is constituted by the first luminance signal having the first gamma characteristic and, when the average level is low, at least a relatively large proportion of the output luminance signal is constituted by the second luminance signal having the second gamma characteristic.

In accordance with another aspect of this invention, in a luminance signal forming circuit, as aforesaid, the first gamma correction means provides a greater than normal first gamma value for suppressing color noise including in the first luminance signal, the second gamma correction means provides a second gamma value greater than the first gamma value, and third gamma correction means acts on the output luminance signal and has a third gamma value selected so that the first luminance signal included in the output luminance signal has applied thereto a total gamma value substantially equal to the normal gamma value for achieving good signal fidelity or luminance reproducibility, while the second luminance signal included in the output luminance signal has applied thereto a total gamma value greater than the normal gamma value. In other words, in the luminance signal forming circuit according to this invention, the product of the first and third gamma values is substantially equal to the normal gamma value for providing the usual good luminance reproducibility, while the product of the second and third gamma values is greater than the normal gamma value for maintaining the S/N ratio.

The above, and other objects, features and advantages of this invention, will be apparent in the following detailed description of illustrative embodiments thereof when read in connection with the accompanying drawings in which corresponding parts and elements are identified by the same reference numerals in the several views.

DETAILED DESCRIPTION OF THE PREFERRED EMBODIMENTS

Figure 1:
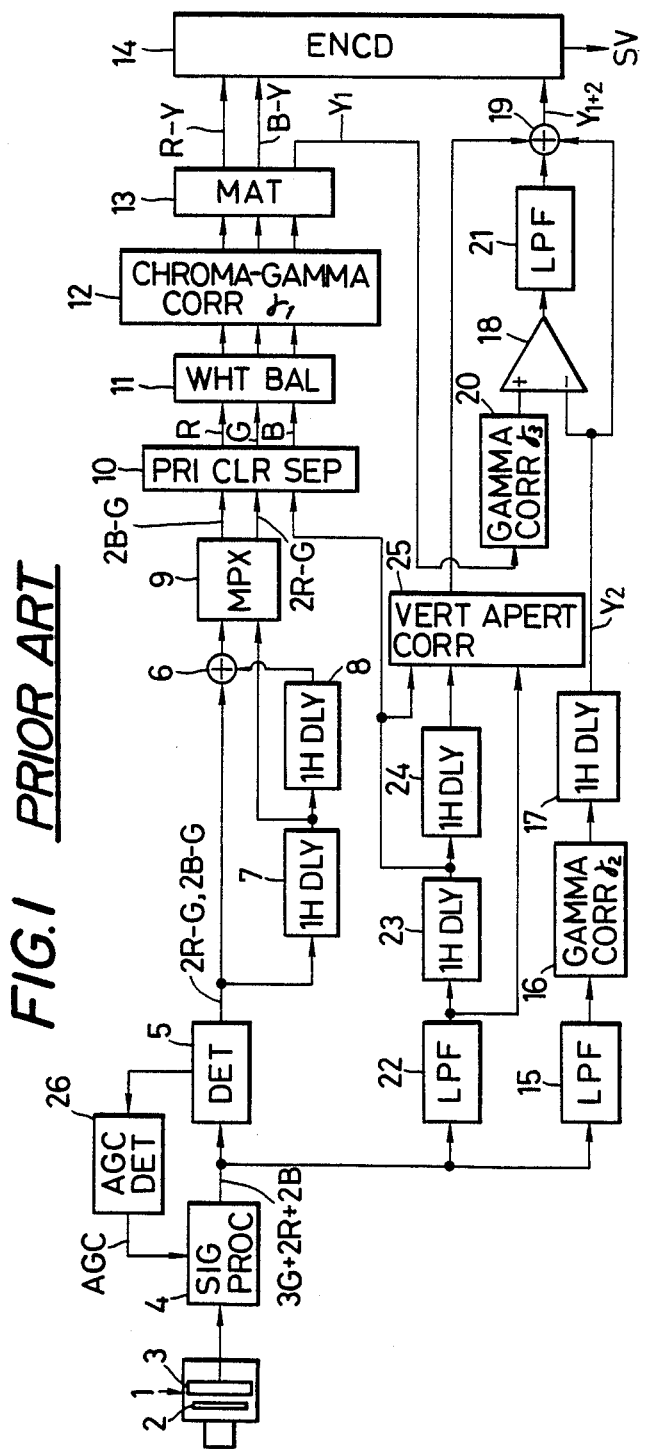
FIG. 1 is a block diagram of a previously proposed luminance signal forming circuit for a color television camera using conventional complementary color filters.

In order that the problems solved by the present invention may be fully understood, reference will first be made to FIG. 1 which shows a previously proposed signal processing section of a television camera using complementary color filters, and which is known internally to employees of the assignee of the present application having a duty of assignment thereto. In the color television camera shown on FIG. 1, light from an object in the field of view of an image pickup section 1 of the camera is applied through a complementary color filter arrangement 2 to an image pickup element 3 which may include, for example, a CCD element. The complementary color filter arrangement 2 may be, as shown on FIG. 2, constituted by filters allowing complementary color components such as, for example, magenta $M_G$, yellow $Y_E$, green G and cyan $C_Y$ color components, to pass through respective unit areas. Signals obtained from the complementary color filter arrangement 2 are picked up by the element 3 in a line-sequential manner and are switched for every field, as indicated by the arrows on FIG. 2.

The signals obtained from the image pickup element 3 are applied to a signal processing circuit 4 to be subjected to predetermined processing, such as, wave shaping, automatic gain control (AGC) correction and the like. The signal processing circuit 4 provides an output signal (3G+2R+2B) which is sampled by a detector 5 so that a signal (2R−G) and a signal (2B−G) are derived from the detector 5 in a line-sequential manner. The output of detector 5 is partially fed back to an AGC detecting circuit 26 which, in response thereto, supplies an automatic gain control signal AGC to the signal processing circuit 4 to regulate the automatic gain control function in the latter. It will be appreciated that the automatic gain control signal (AGC) from detector 26 is an indication of the quantity of light incident on the image pickup element 3 and, therefore, is also indicative of the average level of luminance signals that may be formed from the output signal of detector 5.

The line-sequential signals (2R−G) and (2B−G) are supplied directly from detector 5 to one input of an adder 6 and through delay circuits 7 and 8, in succession, to another input of the adder 6. Each of the delay circuits 7 and 8 provides a 1H delay, with H being a horizontal scan period. The adder 6 adds together ½ of each of the two input signals thereto, and supplies the resulting sum signal to one input of a switching circuit or multiplexer 9 which has another input receiving the output of delay circuit 7. As a result, the switching circuit or multiplexer 9 provides the signals (2R−G) and (2B−G) to a primary color separation circuit 10. The signal (3G+2R+2B) derived from the signal processing circuit 4 is also passed through a low pass filter 22 by which it is averaged to provide a signal having a band width of, for example, 1.0 MHz, passed through a 1H delay circuit 23 to another input of the primary color separation circuit 10. The primary color separation circuit 10 forms primary color signals R, G and B from the signals applied thereto, and such primary color signals are relatively adjusted to have a predetermined white balance by means of a white balance circuit 11. The primary color signals R, G and B which have been provided with the predetermined white balance are then gamma-corrected in a chroma-gamma correction circuit 12 having a gamma value $\gamma_1 = 0.75$ which is substantially higher than the normal or regular gamma value of 0.45. The gamma-corrected primary color signals are subjected to a matrixing operation in a matrix circuit 13 which thereby provides color difference signals (R−Y) and (B−Y), and a low-band luminance signal $Y_1$. The color difference signals (R−Y) and (B−Y) are directly supplied to an encoder 14.

The signal (3G+2R+2B) obtained from the signal processing circuit 4 is further supplied to a low pass filter 15 which extracts therefrom a wide-band signal of about 4.0 MHz. Such wide-band signal from low pass filter 15 is gamma-corrected by a gamma correction circuit 16 having a gamma value $\gamma_2 = 0.45$ and, thereafter, is supplied through a 1H delay circuit 17 to a negative or inverted input of an operational circuit 18 and to an input of an adder 19, as a wide-band luminance signal $Y_2$. Simultaneously, the luminance signal $Y_1$ from matrix circuit 13 is gamma-corrected by a gamma correction circuit 20 prior to being supplied to the positive or non-inverted input of the operational circuit 18. The gamma correction circuit 20 has a gamma value $\gamma_3 = 0.6$ so that the total gamma value for the luminance signal $\gamma_1$, that is, $\gamma_1 \times \gamma_3 = 0.75 \times 0.6 = 0.45$. In other words, the total gamma value for the luminance signal $Y_1$ applied to the operational circuit 18 is the regular or normal gamma value 0.45, and that same regular value is also employed as the gamma value $\gamma_2$ in the gamma correction circuit 16 for the luminance signal $Y_2$.

The operational circuit 18 provides, at its output, a luminance signal corresponding t the difference between the gamma-corrected low-band luminance signal $Y_1$ and the gamma-corrected wide-band luminance signal $Y_2$, and the difference or resultant luminance signal passes through a low pass filter 21 so as to have a band width of, for example, 1.0 MHz, prior to being applied to a second input of the adder 19.

Furthermore, the average signal having a band width of, for example, 1.0 MHz, obtained from low pass filter 22 is supplied to a vertical aperture correction circuit 25 directly, through a 1H delay circuit 23, and through the delay circuit 23 and a succeeding 1H delay circuit 24, respectively. An aperture correction signal provided by correction circuit 25 in response to the three above described inputs thereto is supplied to a third input of the adder 19 which thereby provides an aperture-corrected combined luminance signal $Y_{1+2}$ supplied to the encoder 14. The encoder 1 forms, and provides at its output a television signal SV according to a standardized television scheme, such as, for example, the NTSC standard, on the basis of the color difference signals (R−Y) and (B−Y) and the aperture corrected combined luminance signal $Y_{1+2}$.

Figure 2:
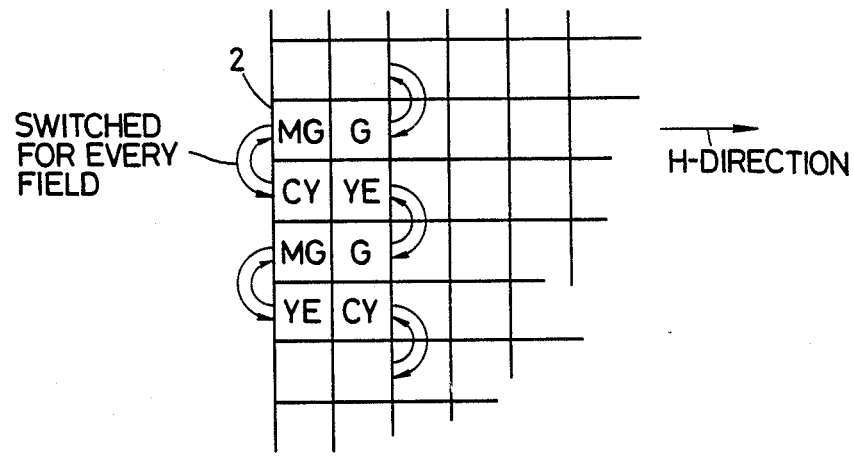
FIG. 2 is a fragmentary diagrammatic view showing an arrangement of the complementary color filters.

It will be appreciated that the delay circuits 7, 8, 17 and 24 in the circuit of FIG. 1 are adapted to provide relative timings suitable for the arrangements of the complementary color filter 2 shown on FIG. 2 and for the described signal processing.

Since the primary color signals R, G and B on which the luminance signal $Y_1$ is based are first relatively adjusted in the white balance circuit 11, the luminance signal $Y_1$ has good luminance reproducibility or fidelity. However, the luminance signal $Y_1$ is mixed with noise components, for example, so called color noise, due to the signal processing subsequent to the detector 5. Thus, the luminance signal $Y_1$ has the regular good luminance reproducibility but a relatively poor S/N ratio. On the other hand, since the luminance signal $Y_2$ is a pseudo luminance signal (3G+2R+2B) obtained in the signal processing circuit 4 by simply mixing the output signals from the image pickup element 3, the luminance signal $Y_2$ has relatively poor luminance reproducibility or fidelity, but a relatively high S/N ratio.

In the previously proposed circuit shown in FIG. 1, the operational circuit 18 calculates the difference between the luminance signal $Y_1$, as gamma-corrected by the circuits 12 and 20, and the luminance signal $Y_2$, as gamma-corrected by the circuit 16, and a low-band signal is derived from the resulting difference signal by the low pass filter 21. The low-band signal from the filter 21 is added to the wide band signal $Y_2$ for achieving the good luminance reproducibility of the luminance signal $Y_1$ while maintaining the high S/N ratio of the luminance signal $Y_2$.

It will be seen that, in the circuit of FIG. 1, the total gamma value applied to the luminance signal $Y_1$, that is $\gamma_1 \times \gamma_3 = 0.75 \times 0.6 = 0.45$, is the regular or normal gamma value employed for achieving good luminance reproducibility or fidelity. Similarly, the gamma value of correction circuit 66 is selected to be 0.45. In other words, in the previously proposed circuit of FIG. 1, a design choice has been made to ensure good luminance reproducibility at the possible expense of a high S/N ratio. Accordingly, the earlier proposed circuit of FIG. 1 cannot always provide the luminance reproducibility and the S/N ratio appropriate to the signal state determined by the quantity of light incident on the image pickup element 3.

Figure 3:
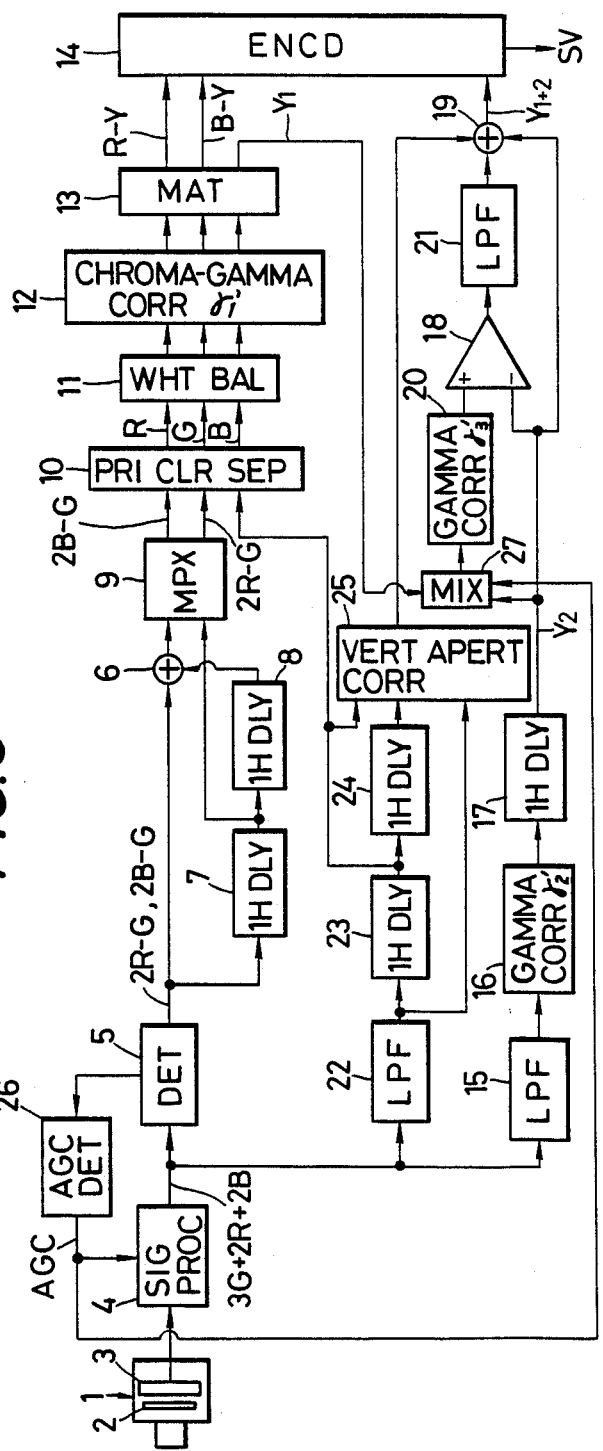
FIG. 3 is a block diagram of a luminance signal forming circuit according to an embodiment of the present invention.

Referring now to FIG. 3 illustrating a luminance signal forming circuit according to an embodiment of the present invention and in which parts corresponding to those described above with reference to FIG. 1 are identified by the same reference numerals and are not again described in detail herein, it will be seen that a mixing circuit 27 receives the luminance signal $Y_1$ having the usual good luminance reproducibility from matrix circuit 13 and the pseudo luminance signal $Y_2$ from the delay circuit 17. The mixing circuit 27 selectively includes such luminance signals $Y_1$ and $Y_2$ in an output lmminance signal supplied to the gamma correction circuit 20 in accordance with the average level of the luminance signals $Y_1$ and $Y_2$, for example, as determined by the automatic gain control signal AGC which responds to the quantity of light incident on the image pickup section 1. When the quantity of light incident on the image pickup section 1 is large, that is, when the average level of the luminance signals $Y_1$ and $Y_2$ is high, at least a relatively large proportion of the luminance signal output from the circuit 27 to the gamma correction circuit 20 is constituted by the low-band luminance signal $Y_1$ which has good luminance reproducibility. On the other hand, when the quantity of light incident on the image pickup section 1 is relatively small, that is, when the average level of the luminance signals $Y_1$ and $Y_2$ is low at least a relatively large proportion of the luminance signal output from the mixing circuit 27 to the gamma correction circuit 20 is constituted by the luminance signal $Y_2$ having a high S/N ratio.

Figure 5A:
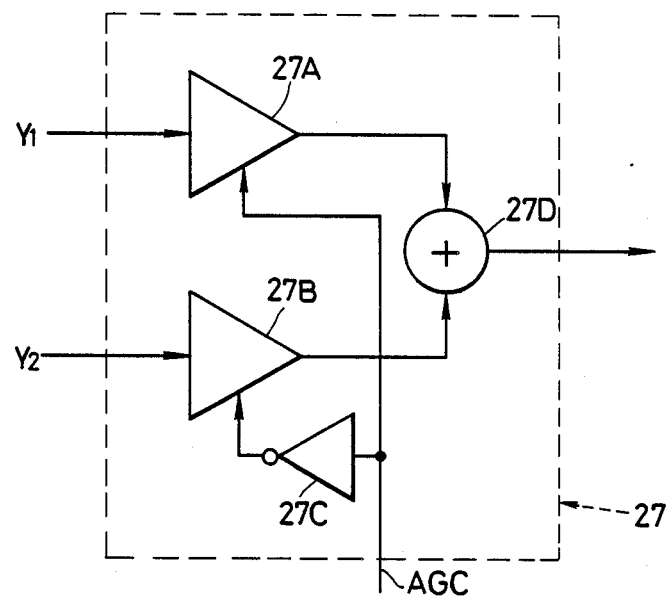
FIG. 5A is a detail view of a luminance signal mixing device included in the circuit of FIG. 3.

The circuit 27 may operate to vary the ratio of the luminance signals $Y_1$ and $Y_2$ in the output luminance signal applied from circuit 27 to the gamma correction circuit 20 in accordance with the automatic gain control signal AGC. For example, as shown on FIG. 5A, the circuit 27 may include first and second variable gain amplifiers 27A and 27 receiving the luminance signals $Y_1$ and $Y_2$, respectively, with the first variable gain amplifier 27A being controlled directly by the automatic gain control signal AGC, while the second variable gain control amplifier 27B is inversely controlled by the automatic gain control signal AGC through an inverter 27C. The outputs of the amplifiers 27A and 27B are added together in an adder 27D to provide the output luminance signal supplied to the gamma correction circuit 20.

Figure 5B:
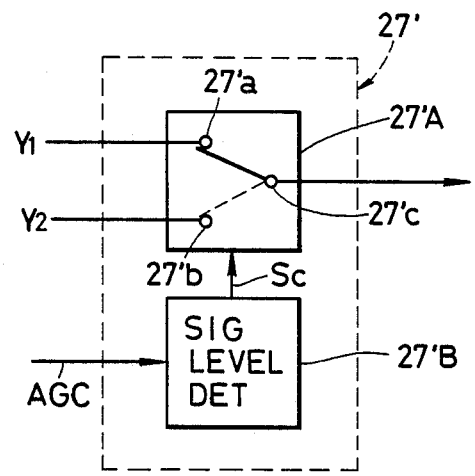
FIG. 5B is a detail view showing another luminance signal mixing device that can be used in the circuit of FIG. 3.

Alternatively, the circuit 27 described above may be replaced by a circuit 27′ shown on FIG. 5B and which is operative to select the luminance signal $Y_1$ to be supplied to the gamma correction circuit 20 when the automatic gain control signal AGC indicates that the quantity of light incident on the image pickup section 1 exceeds a predetermined value, and to select the luminance signal $Y_2$ to be supplied to the gamma correction circuit 20 when the automatic gain control signal AGC indicates that the quantity of light is below the predetermined value. More specifically, as shown on FIG. 5B, the circuit 27′ may comprise a switch circuit 27′A having switching inputs or fixed contacts 27′a and 27′b to which the luminance signals $Y_1$ and $Y_2$ are respectively supplied, and a switch output 27′c in the form of a movable contact and which is connected to the gamma correction circuit 20. Further, the circuit 27′ is shown to include a signal level detector 27'B which receives the automatic gain control signal AGC and, in response to the level thereof, provides a switch control signal $S_c$ for controlling the switch circuit 27'A. It will be appreciated that, so long as the automatic gain control signal AGC is above a predetermined level, the switch control signal $S_c$ from detector 27'B causes the movable contact of the switch circuit 27'A to remain in the condition shown in full lines on FIG. 5B so that the luminance signal $Y_1$ is selected to be supplied to the gamma correction circuit 20. On the other hand, when the automatic gain control signal AGC falls below the predetermined level, the switch control signal $S_c$ changes over switch circuit 27'A to the condition indicated in broken lines on FIG. 5B so that the luminance signal $Y_2$ is then supplied to the gamma correction circuit 20.

In accordance with the present invention, the chroma-gamma correction circuit 12 is provided with a gamma value $\gamma'_1$ that is higher than the regular gamma value 0.45, that is, gamma value $\gamma'_1 = 0.6$. Further, the gamma value $\gamma'_2$ of the gamma correction circuit 16 is made substantially larger than the gamma value $\gamma_2$ of the circuit 16 in FIG. 1. More particularly, the gamma value $\gamma'_2$ of the correction circuit 16 in the circuit of FIG. 3 is, in accordance with the present invention, made to be $\gamma'_2 = 0.8$. Finally, the gamma value $\gamma'_3$ of the gamma correction circuit 20 in FIG. 3 is selected to satisfy the following:

$\gamma'_1 \times \gamma'_3 = 0.45$ (the regular gamma value)

$\gamma'_2 \times \gamma'_3 > 0.45$ (the regular gamma value)

It will be appreciated that the foregoing requirements are satisfied by $\gamma'_3 = 0.75$, in which case, $\gamma'_2 \times \gamma'_3 = 0.6$.

Figure 4:
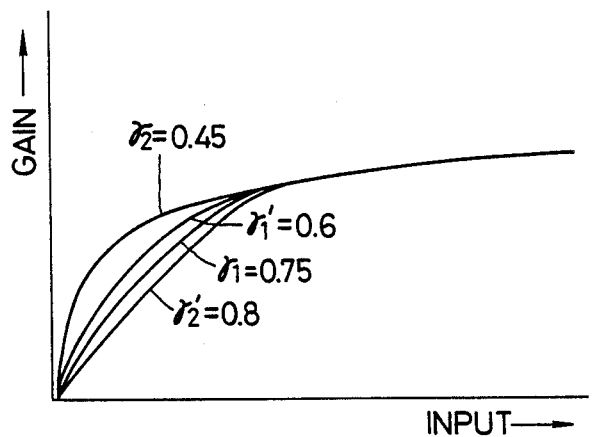
FIG. 4 is a graph showing the gamma-correction characteristics for various gamma values.

FIG. 4 shows the gamma correction characteristics for the various gamma values used in the previously proposed circuit of FIG. 1 and in the circuit according to the present invention shown on FIG. 3. Generally, when gamma corrections of a signal are effected according to such characteristics, as the inclination of the characteristic curve is increased, the noise components in the signal are increased. Conversely, when the inclination of the characteristic curve is moderated or decreased, the noise components can be reduced. Further, as shown on FIG. 4, as the gamma value is increased, the inclination of the respective characteristic curve is generally decreased, at least for input signal levels in the lower portion of the range thereof.

It is to be noted that, if one considers only the reproducibility or fidelity of the luminance signal $Y_1$ and of the color difference signals $(R-Y)$ and $(B-Y)$, it is desirable to provide the chroma-gamma correction circuit 12 with the regular gamma value 0.45. However, since the S/N ratios of the color signals are poor, the gamma value $\gamma'_1$ is increased to 0.6, that is, is made greater than the normal value of 0.45, in order to suppress the color noise. Although the gamma correction circuit 12 is provided with a gamma value greater than the regular value of 0.45 for suppressing color noise, it is very important for the sake of maintaining fidelity or luminance reproducibility that the total gamma value for the luminance signal $Y_1$ obtained from the primary color signals R, G and B by a matrixing operation should be the regular gamma value 0.45. Thus, the total gamma value applied to the luminance signal $Y_1$ in gamma correction circuits 12 and 20 is $\gamma'_1 \times \gamma'_3 = 0.6 \times 0.75 = 0.45$. On the other hand, in the case of the pseudo luminance signal $Y_2$ obtained by merely mixing the output signals from the camera, fidelity is not an important consideration, and th principal object is to maintain the relatively high S/N ratio of such luminance signal $Y_2$. Thus, the gamma values $\gamma'_2$ and $\gamma'_3$ of the gamma correction circuits 16 and 20 are selected so that the total gamma value thereby applied to the luminance signal $Y_2$ is 0.60, that is, greater than the regular gamma value, for maintaining the high S/N ratio thereof.

The circuit according to the present invention described above with reference to FIG. 3 operates as follows:

When a relatively bright object is in the field of view of the camera so that the quantity of light incident on the image pickup element 3 is sufficiently large to avoid any problem with respect to the S/N ratio, the circuit 27 is operative to cause at least a relative large proportion of the output luminance signal $Y_{1+2}$ to be constituted by the luminance signal $Y_1$ formed by a matrixing operation from the primary color signals R, G and B, and therefore having good luminance reproducibility or fidelity. When at least a large proportion of the output signal from the circuit 27 is constituted by the luminance signal $Y_1$, the further gamma correction of that output signal by the gamma correction circuit 20 achieves a total gamma value of 0.45, that is, $\gamma'_1 \times \gamma'_3 = 0.45$. Thus, the total gamma correction is appropriate for a luminance signal formed, for the most part, of a luminance signal component having good luminance reproducibility, so long as the quantity of light incident on the image pickup element 3 is sufficient to avoid any problem with the S/N ratio which is relatively poor for the luminance signal $Y_1$.

When the quantity of light incident on the image pickup element 3 is decreased and the AGC control function becomes operative, the proportion of the luminance signal $Y_2$ having a high S/N ratio included in the signal $Y_{1+2}$ is increased. In respect to the luminance signal $Y_2$ included in the output luminance signal $Y_{1+2}$, it will be seen that the total gamma value therefor is $\gamma'_2 \times \gamma'_3 = 0.8 \times 0.75 = 0.6$, that is, the total gamma value for the luminance signal $Y_2$ is greater than the regular gamma value. As shown on FIG. 4, the inclination of the gamma correction curve corresponding to the gamma value 0.6 is substantially smaller than the inclination of a gamma correction curve corresponding to the regular gamma value 0.45, with the result that the good S/N ratio of the luminance signal $Y_2$ included in the output luminance signal $Y_{1+2}$ is maintained.

In the embodiment of the invention described above with reference to FIG. 3, the luminance signal $Y_2$ is employed as a high-band portion of the output luminance signal $Y_{1+2}$ as a result of the frequency characteristic of the 1H delay circuits 7, 8, 23 and 24. However, in a luminance signal forming circuit according to the present invention, the luminance signal $Y_1$ may be used as a high-band portion of the output luminance signal $Y_{1+2}$.

By way of summary, it will be appreciated that, in the luminance signal forming circuit according to the present invention, the luminance signal $Y_1$ having good luminance reproducibility or tee luminance signal $Y_2$ having a high S/N ratio is selected to be dominant in the output luminance signal in accordance with the quantity of light incident on the image pickup element 3 of the camera, and the gamma correction characteristics are changed, also in accordance with the quantity of light incident on the image pickup element which, in turn, determines the average levels of the signals $Y_1$ and $Y_2$, so as to reduce the noise component of the output luminance signal, with the result that an optimal luminance signal can always be formed.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A luminance signal forming circuit for a color television camera having complementary color filtering means through which light from an object is incident on image pickup means for providing output signals therefrom, said luminance signal forming circuit comprising:

means for performing a matrixing operation in respect to primary color signals obtained from said output signals of the camera so as to provide a first luminance signal;

first gamma correction means for providing said first luminance signal with a first gamma characteristic having a predetermined inclination;

means for mixing said output signals from the camera so as to obtain therefrom a second luminance signal;

second gamma correction means for providing said second luminance signal with a second gamma characteristic having an inclination substantially smaller than said predetermined inclination of said first gamma characteristic; and means for selectively including said first and second luminance signals in an output luminance signal in accordance with the quantity of said last incident on the image pickup means so that, when the quantity of said light is high, at least a relatively large proportion of said output luminance signal is constituted by said first luminance signal having said first gamma characteristic and, when said quantity of light is low, at least a relatively large proportion of said output luminance signal is constituted by said second luminance signal having a second gamma characteristic.

2. A luminance signal forming circuit according to claim 1; wherein said means for selectively including said first and second luminance signals in said output luminance signal includes detection means for detecting level of said output signals from the camera and providing a corresponding detection output, and means for varying a ratio of said first and second luminance signals in said output luminance signal in accordance with said detection output.

3. A luminance signal forming circuit according to claim 2; wherein said detection means includes an automatic gain control circuit, and said detection output is an automatic gain control signal therefrom.

4. A luminance signal forming circuit according to claim 3; wherein said means for varying the ratio of said first and second luminance signals in said output luminance signal includes first and second variable gain amplifiers receiving said first and second luminance signals, respectively, said first variable gain amplifier being controlled by said automatic gain control signal directly, inverting means through which said automatic gain control signal is applied to said second variable gain control amplifier so that the latter is inversely controlled by said automatic gain control signal, and means for adding together the outputs of said first and second variable gain control amplifiers to constitute said output luminance signal.

5. A luminance signal forming circuit according to claim 1; wherein said means for selectively including said first and second luminance signals in said output luminance signal include switch means having first and second inputs receiving said first and second luminance signals, respectively, and a switch output selectively connected with said first and second inputs in first and second conditions, respectively, of said switch means, detection means for detecting a level of said output signals from the camera and providing a corresponding detection output, and means for establishing said first and second conditions of said switch means when said detection output is above and below, respectively, a predetermined value.

6. A luminance signal forming circuit according to claim 5; wherein said detection means includes an automatic gain control circuit and said detection output is an automatic gain control signal therefrom.

7. A luminance signal forming circuit according to claim 1; wherein said first luminance signal has a relatively low signal-to-noise ratio due to color noise and relatively high luminance reproducibility, said first gamma correction means provides a greater than normal first gamma value for suppressing said color noise, said second luminance signal has a relatively high signal-to-noise ratio and relatively poor luminance reproducibility, and said second gamma correction means provides a second gamma value greater than said first gamma value; and further comprising third gamma correction means acting on said output luminance signal and having a third gamma value selected so that said first luminance signal included in said output luminance signal has applied thereto a total gamma value substantially equal to the normal gamma value for achieving good signal fidelity and so that said second luminance signal included in said output luminance signal has applied thereto a total gamma value greater than said normal gamma value.

8. A luminance signal forming circuit according to claim 7; wherein the product of said first and third gamma values is substantially equal to said normal gamma value, and the product of said second and third gamma values is greater than said normal gamma value.

9. A luminance signal forming circuit according to claim 7; further comprising operational means for obtaining the difference between said output luminance signal from said third gamma correction means and said second luminance signal from said second gamma correction means, and means for adding said second luminance signal from said second gamma correction means to said difference from said operational means for obtaining therefrom a corrected luminance signal.

10. A luminance signal forming circuit according to claim 1; further comprising operational means for obtaining the difference between said output luminance signal in which said first and second luminance signals are selectively included and said second luminance signal from said second gamma correction means, and means for adding said second luminance signal from the second gamma correction means to said difference from said operational means.

* * * * *